United States Patent
Cull et al.

(10) Patent No.: US 9,030,793 B2
(45) Date of Patent: May 12, 2015

(54) METHOD, DEVICE, AND SYSTEM FOR MONITORING CURRENT PROVIDED TO A LOAD

(75) Inventors: Zachary Herman Cull, Louisville, KY (US); Craig Benjamin Williams, Louisville, KY (US)

(73) Assignee: General Electric Company, Schnectady, NY (US)

( * ) Notice: Subject to any disclaimer, the term of this patent is extended or adjusted under 35 U.S.C. 154(b) by 348 days.

(21) Appl. No.: 13/446,144

(22) Filed: Apr. 13, 2012

(65) Prior Publication Data
US 2013/0271886 A1    Oct. 17, 2013

(51) Int. Cl.
*H02H 3/08*    (2006.01)

(52) U.S. Cl.
CPC ........................................ *H02H 3/08* (2013.01)

(58) Field of Classification Search
CPC ........... H02H 3/08; H02H 3/28; H02H 3/087; H03K 17/0822; H03F 1/52
USPC ...................................... 361/87, 42, 86, 93.9
See application file for complete search history.

(56) References Cited

U.S. PATENT DOCUMENTS

| | | | |
|---|---|---|---|
| 4,115,829 A | 9/1978 | Howell | |
| 4,301,491 A | 11/1981 | Gryctko | |
| 4,347,541 A | 8/1982 | Chen et al. | |
| 4,724,502 A | 2/1988 | Kawahira et al. | |
| 4,866,558 A * | 9/1989 | Ishii | 361/96 |
| 4,870,532 A | 9/1989 | Beatty, Jr. et al. | |
| 5,331,500 A | 7/1994 | Corcoles et al. | |
| 5,667,711 A | 9/1997 | Mody et al. | |
| 5,774,319 A | 6/1998 | Carter et al. | |
| 6,717,786 B2 | 4/2004 | Holley et al. | |
| 7,683,586 B2 | 3/2010 | Davison et al. | |
| 7,688,034 B2 | 3/2010 | Gabello et al. | |
| 7,907,375 B2 | 3/2011 | Blakely et al. | |
| 2004/0044486 A1 | 3/2004 | Tignor | |
| 2011/0025515 A1 | 2/2011 | Suthar et al. | |
| 2011/0057808 A1 | 3/2011 | Huang | |
| 2011/0228429 A1 | 9/2011 | Ueta et al. | |

FOREIGN PATENT DOCUMENTS

| | | |
|---|---|---|
| CN | 2008223083 | 1/2010 |
| EP | 0591075 B1 | 12/1996 |
| WO | 2011089186 A1 | 7/2011 |

OTHER PUBLICATIONS

Search Report and Written Opinion from EP Application No. 13162678.0 dated Jul. 22, 2013.

* cited by examiner

*Primary Examiner* — Jared Fureman
*Assistant Examiner* — Nicholas Ieva
(74) *Attorney, Agent, or Firm* — General Electric Company (57) ABSTRACT

A circuit protection device for monitoring a current flowing from an electrical distribution line through a trip mechanism to a load includes an input conductor configured to receive a current signal from a sensor. At least one resistor is arranged to receive the current signal from the input conductor, and provides a voltage signal proportional to the current signal. The circuit protection device includes a control circuit coupled in parallel with the resistor and a power supply that receives the current signal from the resistor and supplies power to the control circuit based on the current signal. The control circuit is configured to receive the voltage signal and determine an amplitude of the current flowing through the trip mechanism based on the voltage signal. The control circuit is also configured to determine whether a predetermined current threshold is exceeded and to generate a control signal to activate the trip mechanism.

18 Claims, 4 Drawing Sheets

METHOD, DEVICE, AND SYSTEM FOR MONITORING CURRENT PROVIDED TO A LOAD

BACKGROUND OF THE INVENTION

The present application relates generally to monitoring systems and, more particularly, to a method, device, and system for use in monitoring current provided to a load.

Known electrical distribution circuits include a plurality of switchgear or other circuit breakers that are coupled to one or more loads. The switchgear and/or circuit breakers typically include a trip mechanism that interrupts current flowing to the loads if the current exceeds a current threshold and/or if the current otherwise is outside of acceptable operating conditions.

At least some known circuit breakers and/or switchgear include a primary current transformer that measures the current flowing through the trip mechanism contacts. Such circuit breakers and/or switchgear may also include a self-powered electronic trip unit (ETU) that programmably activates the trip mechanism to interrupt the current provided to the load. Such self-powered ETUs typically include a secondary current transformer coupled in series with a power supply to monitor current and to electrically decouple the power supply from the electrical distribution circuits. However, the secondary current transformers may undesirably increase a cost and/or a size of the self-powered ETUs, and may also cause the ETUs to be more susceptible to noise as compared to ETUs that do not include the secondary current transformers.

BRIEF DESCRIPTION OF THE INVENTION

In one aspect, a circuit protection device for use in monitoring a current flowing from an electrical distribution line through a trip mechanism to a load is provided that includes an input conductor configured to receive a current signal from a sensor. At least one resistor is coupled to the input conductor. The at least one resistor is arranged to receive the current signal and is configured to provide a voltage signal proportional to the current signal. The circuit protection device includes a control circuit coupled in parallel with the resistor, and a power supply coupled to the resistor and configured to receive the current signal from the resistor and to supply power to the control circuit based on the current signal. The control circuit is configured to receive the voltage signal and determine an amplitude of the current flowing through the trip mechanism based on the voltage signal. The control circuit is also configured to determine whether a predetermined current threshold is exceeded and to generate a control signal to activate the trip mechanism.

In another aspect, a circuit protection system for use in monitoring current provided to a load from an electrical distribution line is provided. The circuit protection system includes a trip mechanism configured to be coupled the electrical distribution line and to the load to enable a current received from the electrical distribution line to flow through the trip mechanism to the load. The trip mechanism is further configured to be activated to interrupt the current flowing to the load. The circuit protection system also includes a sensor configured to measure the current flowing through the trip mechanism and to generate a current signal representative of the measured current, and a circuit protection device coupled to the sensor. The circuit protection device includes an input conductor configured to receive the current signal from the sensor, and at least one resistor coupled to the input conductor. The at least one resistor is arranged to receive the current signal and is configured to provide a voltage signal proportional to the current signal. The circuit protection device also includes a control circuit coupled in parallel with the at least one resistor and configured to receive the voltage signal and determine an amplitude of the current flowing through the trip mechanism to the load based on the voltage signal. The control circuit is also configured to determine whether a predetermined current threshold is exceeded and to generate a control signal to activate the trip mechanism. The circuit protection device also includes a power supply coupled to the resistor and configured to receive the current signal from the resistor and to supply power to the control circuit based on the current signal.

In another aspect, a method of monitoring current provided to a load using a circuit protection device is provided that includes receiving a current signal representative of an amount of current flowing through a trip mechanism to the load and transmitting the current signal through at least one resistor to provide a voltage signal proportional to the current signal. The method also includes determining an amplitude of the current flowing through the trip mechanism to the load based on the voltage, determining whether a predetermined current threshold is exceeded, and generating a control signal to activate the trip mechanism to prevent current from being provided to the load.

DETAILED DESCRIPTION OF THE INVENTION

Exemplary embodiments of a method, device, and system for use in monitoring current provided to a load are described herein. Alternating current (AC) is received from an electrical distribution line and is transmitted through a trip mechanism to the load. A sensor measures an amount of current transmitted through the trip mechanism and generates a current signal representative of the amount of current measured. The sensor transmits the current signal to a circuit protection device. The circuit protection device receives the current signal and transmits the current signal through a shunt resistor to generate a voltage across the resistor. A power supply receives the current signal and converts the signal to direct current (DC) for use in supplying DC power to the components of the circuit protection device. A control circuit coupled in parallel with the shunt resistor receives the voltage generated across the resistor. The control circuit adjusts an amplitude of the voltage and converts the voltage into current data representative of the amount of current flowing through the trip mechanism. The control circuit includes a processor that analyzes the current data, including an amplitude of the current, to determine whether the current amplitude exceeds a predetermined threshold. If the current amplitude exceeds the current threshold, the processor transmits a control signal to a flux shifter to cause the trip mechanism to be activated. Accordingly, in an exemplary embodiment, the circuit protection device is a self-powered electronic trip unit that monitors the current flowing through the trip mechanism in a cost-effective and compact manner. In addition, by receiving the current data before the current signal is converted to DC by the power supply, a phase angle of the current signal is preserved for use in analyzing whether one or more fault conditions have occurred. Additionally, because the resistor provides a full sinusoidal AC signal to the power supply, additional circuitry, such as zero crossing detection circuitry) is not required.

Figure 1:
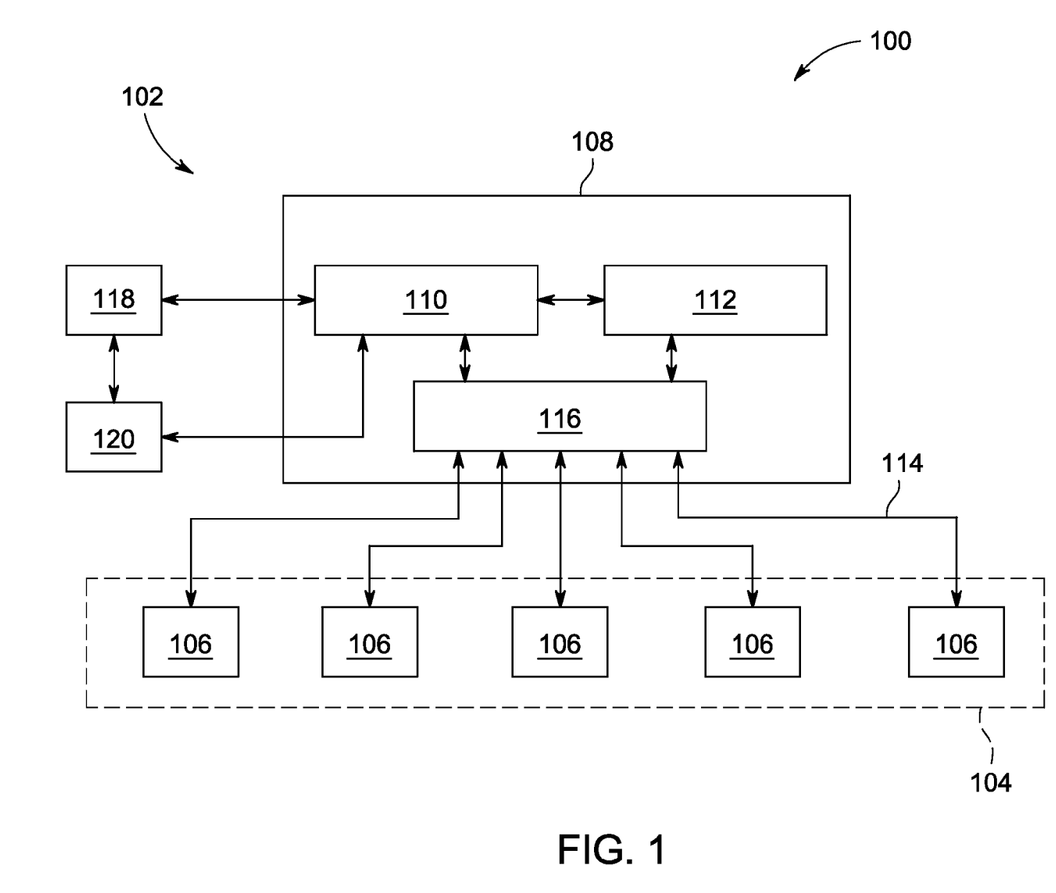
FIG. 1 is a schematic block diagram of an exemplary power system.

FIG. 1 is a schematic block diagram of an exemplary power system 100 that includes an equipment protection system 102 and a distribution system 104. In an exemplary embodiment, distribution system 104 includes a plurality of switchgear units 106 (also referred to as circuit breakers). Alternatively, distribution system 104 includes any other circuit protection system that enables power system 100 to function as described herein. Protection system 102 includes a central controller 108 that includes a processor 110 and a memory 112 coupled to processor 110. Processor 110 controls and/or monitors operation of switchgear units 106. More specifically, processor 110 controls and/or monitors operation of a plurality of trip mechanisms and circuit protection devices (neither shown in FIG. 1) within switchgear units 106. Processor 110 communicates with switchgear units 106 through a network 114. For example, central controller 108 includes a central communication unit 116 that enables transmitting and receiving data and/or commands between processor 110 and switchgear units 106 through network 114.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 112 stores program code and instructions, executable by processor 110, to control and/or monitor switchgear units 106. Memory 112 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 112. Memory 112 may also be, or include, a detachable or removable memory, including, but not limited to, a suitable cartridge, disk, CD ROM, DVD or USB memory.

In an exemplary embodiment, protection system 102 includes a display device 118 and a user input device 120 that provide a user interface for monitoring and controlling distribution system 104 using protection system 102. User input device 120 includes, without limitation, a keyboard, a keypad, a touch-sensitive screen, a mouse, a scroll wheel, a pointing device, an audio input device employing speech-recognition software, and/or any suitable device that enables a user to input data into power distribution system 104.

Display device 118 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, display device 118 includes a touch-screen with an associated touch-screen controller such that user input device 120 is at least partially integrated with display device 118.

Figure 2:
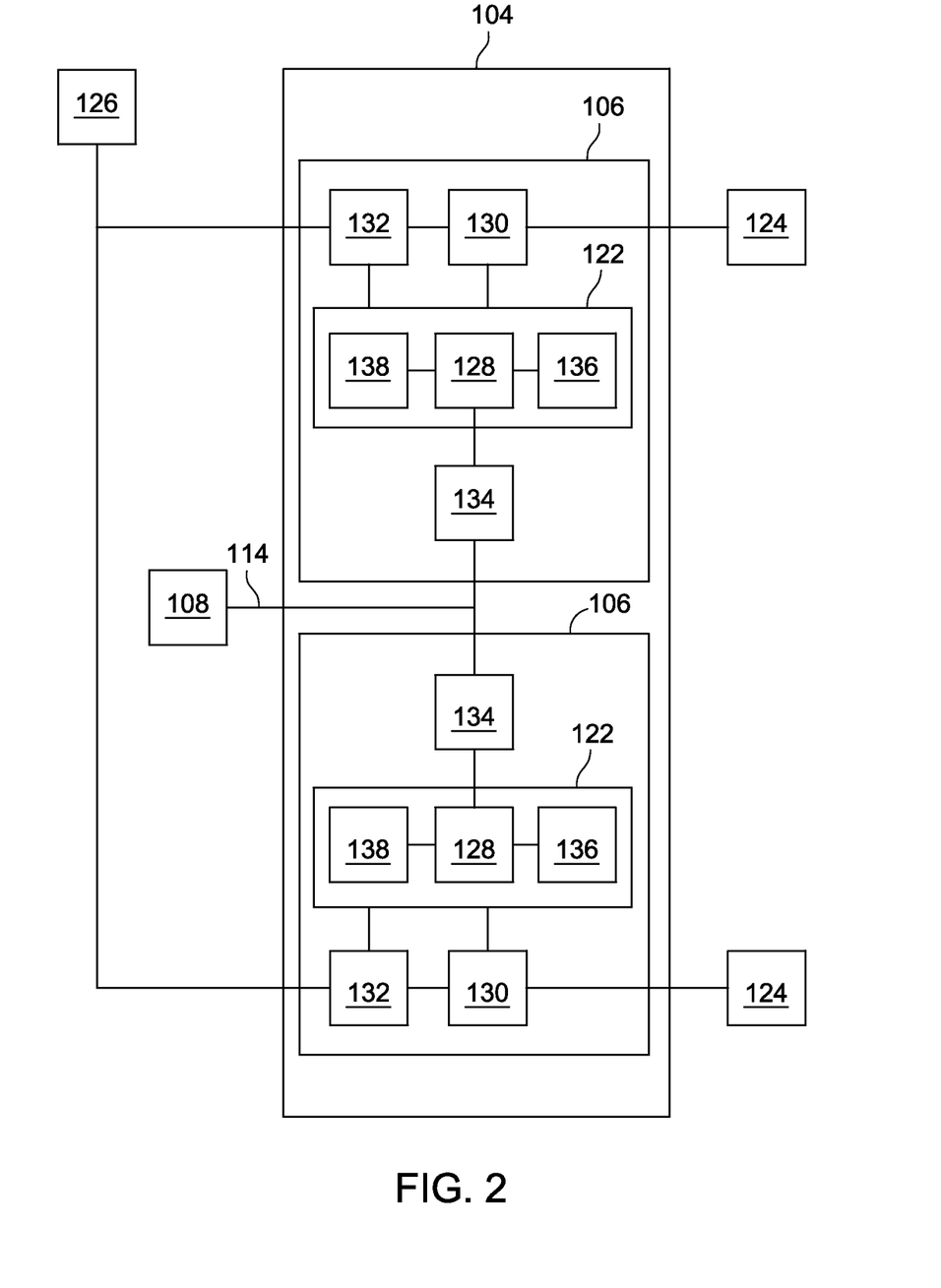
FIG. 2 is a schematic block diagram of an exemplary power distribution system that may be used with the power system shown in FIG. 1.

FIG. 2 is a schematic block diagram of power distribution system 104 including a plurality of circuit protection devices 122. Each circuit protection device 122 is removably coupled within switchgear unit 106 and is configured to programmably control power to one or more loads 124. In an exemplary embodiment, circuit protection device 122 is an electronic trip unit (ETU) 122.

Loads 124 may include, but are not limited to only including, machinery, motors, lighting, and/or other electrical and mechanical equipment of a manufacturing or power generation or distribution facility. Power is provided to switchgear unit 106 from an electrical distribution line 126, which is also coupled to circuit protection device 122.

Each circuit protection device 122 includes a processor 128 for controlling circuit protection device 122. In addition, each circuit protection device 122 is coupled to at least one sensor 130 and at least one trip mechanism 132, such as one or more circuit breaker devices or arc containment devices. Exemplary circuit breaker devices include, for example, circuit switches, contact arms, and/or circuit interrupters that interrupt current flow through the circuit breaker device to a load coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

In an exemplary embodiment, sensor 130 is a current sensor, such as a current transformer, a Rogowski coil, a Hall-effect sensor, and/or a shunt that measures a current flowing through trip mechanism 132. Alternatively, sensor 130 may include any other sensor that enables power distribution system 104 to function as described herein. In an exemplary embodiment, each sensor 130 generates a signal representative of the measured or detected current (hereinafter referred to as "current signal") flowing through an associated trip mechanism 132. In addition, each sensor 130 transmits the current signal to processor 128 associated with, or coupled to, trip mechanism 132. Each processor 128 is programmed to activate trip mechanism 132 to interrupt a current provided to a load 124 if the current signal, and/or the current represented by the current signal, exceeds a programmable current threshold.

In an exemplary embodiment, processors 128 are also communicatively coupled to central controller 108. For example, processors 128 may be directly coupled for communication with central controller 108, or may be coupled for communication with central controller 108 through a communication unit 134. Communication between processors 128 and central controller 108 may also be provided through a hardwired communication link or through a wireless communication link. Processors 128 collect measured operating condition data relating to a corresponding trip mechanism 132. For example, each processor 128 gathers measured operating condition data, such as data representative of the current signal (also referred to herein as "current data"), from a sensor 130 associated with a trip mechanism 132 coupled to processor 128. Processor 128 stores the current data in a memory 136 coupled to processor 128, and/or transmits the current data to central controller 108.

Memory 136 stores program code and instructions, executable by processor 128, to control and/or monitor circuit protection device 122 and/or trip mechanism 132. In an exemplary embodiment, memory 136 includes non-volatile RAM to enable data stored in memory 136 to be retained after a power loss. Alternatively or additionally, memory 136 may include magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 136. Memory 136 may also be, or include, a detachable or removable memory, including, but not limited to, a suitable cartridge, disk, CD ROM, DVD or USB memory.

In one embodiment, circuit protection device 122 also includes a display device 138 coupled to processor 128. In a specific embodiment, display device 138 includes one or more light-emitting diodes (LEDs) that indicate a status of circuit protection device 122 and/or trip mechanism 132. For example, processor 128 may activate one or more components (e.g., LEDs) of display device 138 to indicate that circuit protection device 122 and/or trip mechanism 132 is active and/or operating normally, that a fault or failure has occurred, and/or any other status of trip mechanism 132 and/or circuit protection device 122.

While circuit protection device 122 has been described in FIG. 2 with reference to switchgear units 106 of power distribution system 104, it should be recognized that circuit protection device 122, or any components thereof, may be used with any device or system that enables power distribution system to function as described herein.

Figure 3:
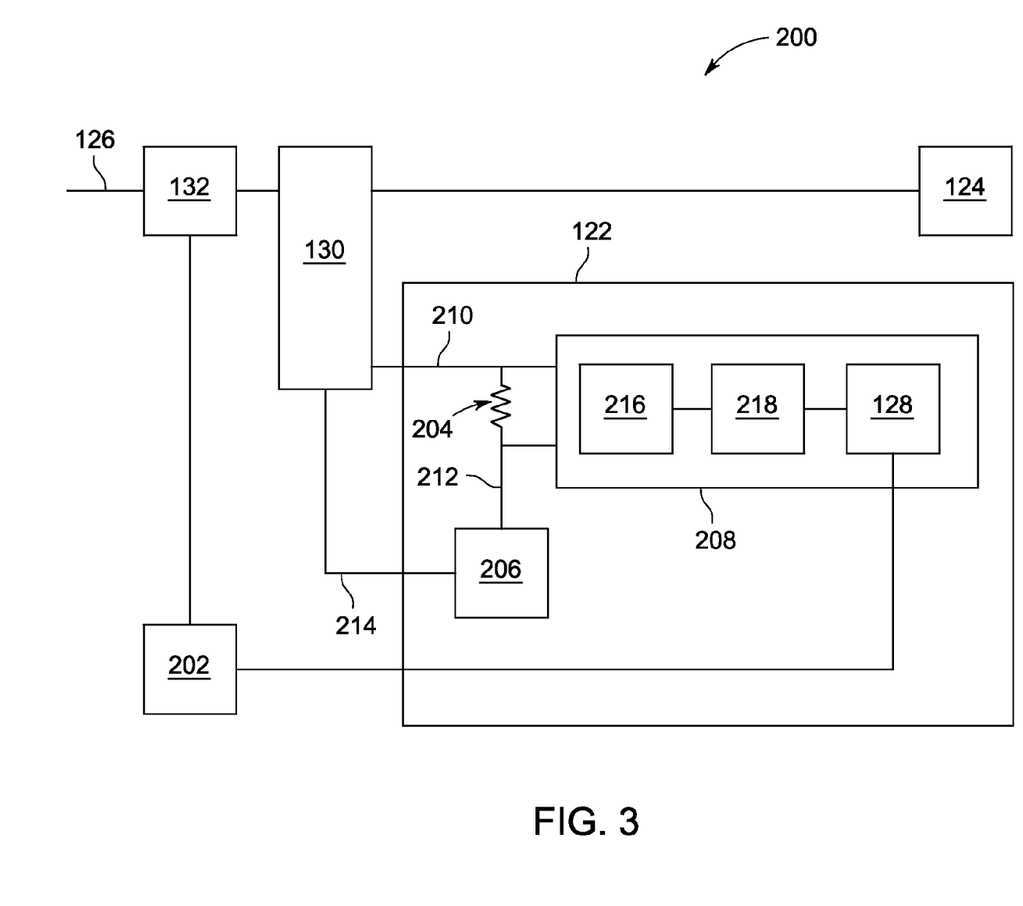
FIG. 3 is a schematic block diagram of an exemplary circuit protection system that may be used with the power distribution system shown in FIG. 2.

FIG. 3 is a schematic block diagram of an exemplary circuit protection system 200 that may be used with power distribution system 104 (shown in FIG. 2). Components of FIG. 3 that are similar to components of FIG. 2 are illustrated in FIG. 3 with the same reference numerals used in FIG. 2.

In an exemplary embodiment, circuit protection system 200 includes trip mechanism 132, a flux shifter 202 coupled to trip mechanism 132, sensor 130, and circuit protection device 122. Trip mechanism 132 is coupled to electrical distribution line 126, which supplies electrical power to load 124. Trip mechanism 132, in an exemplary embodiment, is activated or controlled by circuit protection device 122 and flux shifter 202 to electrically disconnect load 124 from electrical distribution line 126.

Flux shifter 202 is an electromechanical device that is coupled to processor 128 and that generates a magnetic field in response to a control signal received from processor 128. Flux shifter 202 is positioned proximate to trip mechanism 132 such that the magnetic field causes flux shifter 202 to activate trip mechanism 132, thus preventing current from flowing through trip mechanism 132 and/or circuit protection device 122 to load 124. Alternatively, any suitable actuator may be used to activate trip mechanism 132 in response to the control signal received from processor 128.

Sensor 130 is coupled to trip mechanism 132 and to circuit protection device 122. In an exemplary embodiment, sensor 130 detects an amount of current supplied by electrical distribution line 126 and transmits a current signal that is proportional to the current flowing through electrical distribution line 126 to circuit protection device 122.

Circuit protection device 122, in an exemplary embodiment, includes a shunt resistor 204, a power supply 206, and a control circuit 208. In an exemplary embodiment, circuit protection device 122 is a self-powered ETU that includes an integrated power supply 206, as described more fully herein.

Shunt resistor 204, in an exemplary embodiment, is coupled between a first, or input, conductor 210 and a second, or supply, conductor 212 of circuit protection device 122. Input conductor 210 is coupled to sensor 130, and supply conductor 212 is coupled to power supply 206. More specifically, power supply 206 is coupled in series with shunt resistor 204 by supply conductor 212. In one embodiment, a plurality of shunt resistors 204 are coupled in parallel with each other between input conductor 210 and supply conductor 212. In an exemplary embodiment, a voltage is generated across shunt resistor 204 when current is received through input conductor 210.

In an exemplary embodiment, power supply 206 is a switch mode power supply 206, integrated within circuit protection device 122, that includes a plurality of switching devices (not shown), such as a plurality of transistors. Power supply 206 receives alternating current (AC) from input conductor 210, through shunt resistor 204, and converts the current to direct current (DC) by rectifying the current. Power supply 206 supplies DC power to components of circuit protection device 122, such as control circuit 208. In addition, power supply 206 transmits an output signal to sensor 130 through a third, or output, conductor 214 to complete an electrical path for the current signal.

In an exemplary embodiment, power supply 206 is coupled downstream from shunt resistor 204 such that the current signal is transmitted through resistor 204 before being rectified by power supply 206. Accordingly, the current signal transmitted through shunt resistor 204 is a full sinusoidal AC signal received from sensor 130, and the current signal retains phase information for use in determining whether one or more faults have occurred within circuit protection system 200 and/or power distribution system 104 (shown in FIG. 2).

Control circuit 208 is coupled in parallel with shunt resistor 204 and receives the voltage signal (or voltage) generated across resistor 204. It should be recognized that the voltage signal is an AC signal generated from the alternating current flowing through shunt resistor 204. Control circuit 208 includes a gain circuit 216, a conditioning circuit 218 coupled to gain circuit 216, and processor 128 coupled to conditioning circuit 218.

In an exemplary embodiment, gain circuit 216 includes an operational amplifier that adjusts an amplitude of the voltage received to a voltage suitable for use with conditioning circuit 218 and processor 128. Conditioning circuit 218 includes an analog-to-digital converter (ADC) that converts the voltage received into one or more data values representative of, or proportional to, the current flowing through trip mechanism 132. In one embodiment, processor 128 divides the data values by the resistance of shunt resistor 204 to obtain the amplitude of the current flowing through trip mechanism 132.

During operation, AC current is received from electrical distribution line 126 and is transmitted through trip mechanism 132 and sensor 130 to load 124. Sensor 130 generates a current signal representative of the amount of current flowing through trip mechanism 132 and transmits the current signal to circuit protection device 122.

Circuit protection device 122 receives the current signal through input conductor 210. The current signal is transmitted through shunt resistor 204 to generate a voltage across resistor 204. Power supply 206 receives the AC current signal from shunt resistor 204, converts the signal to DC, and supplies DC power to components of circuit protection device 122.

Control circuit 208 receives the voltage generated across shunt resistor 204 and conditions the voltage for use with processor 128. More specifically, gain circuit 216 adjusts the voltage amplitude to an amplitude suitable for use with conditioning circuit 218 and/or processor 128. Conditioning circuit 218 converts the voltage into current data representative of the amount of current flowing through trip mechanism 132. Conditioning circuit 218 transmits the current data to processor 128. Alternatively, conditioning circuit 218 converts the voltage into a plurality of digital voltage values, and processor 128 generates the current data (e.g., data representative of the current flowing through trip mechanism 132) from the voltage values.

In an exemplary embodiment, processor 128 analyzes the current data, including an amplitude of the current and a phase angle of the current, to determine whether a fault has occurred within circuit protection system 200 and/or power distribution system 104 and/or to determine whether circuit protection system 200 and/or power distribution system 104 are operating in unacceptable or undesired conditions. For example, processor 128 compares the current amplitude to a predetermined current threshold to determine whether the current amplitude exceeds the current threshold. If the amplitude of the current flowing through trip mechanism 132 exceeds the current threshold, processor 128 transmits a control signal to flux shifter 202 to cause trip mechanism 132 to be activated.

Flux shifter 202 receives the control signal and generates a magnetic field in response to the control signal. The magnetic field causes flux shifter 202 to trip, or activate, trip mechanism 132 to prevent current from flowing through trip mechanism 132, thus electrically disconnecting load 124 from electrical distribution line 126.

While circuit protection system 200 is illustrated in FIG. 3 as a single phase system including a single sensor 130, a single input conductor 210, and a single shunt resistor 204, any suitable number of phases may be included within circuit protection system 200. For example, circuit protection system 200 may be a three phase system that includes a separate sensor 130, a separate input conductor 210, and a separate shunt resistor 204 for each phase.

Figure 4:
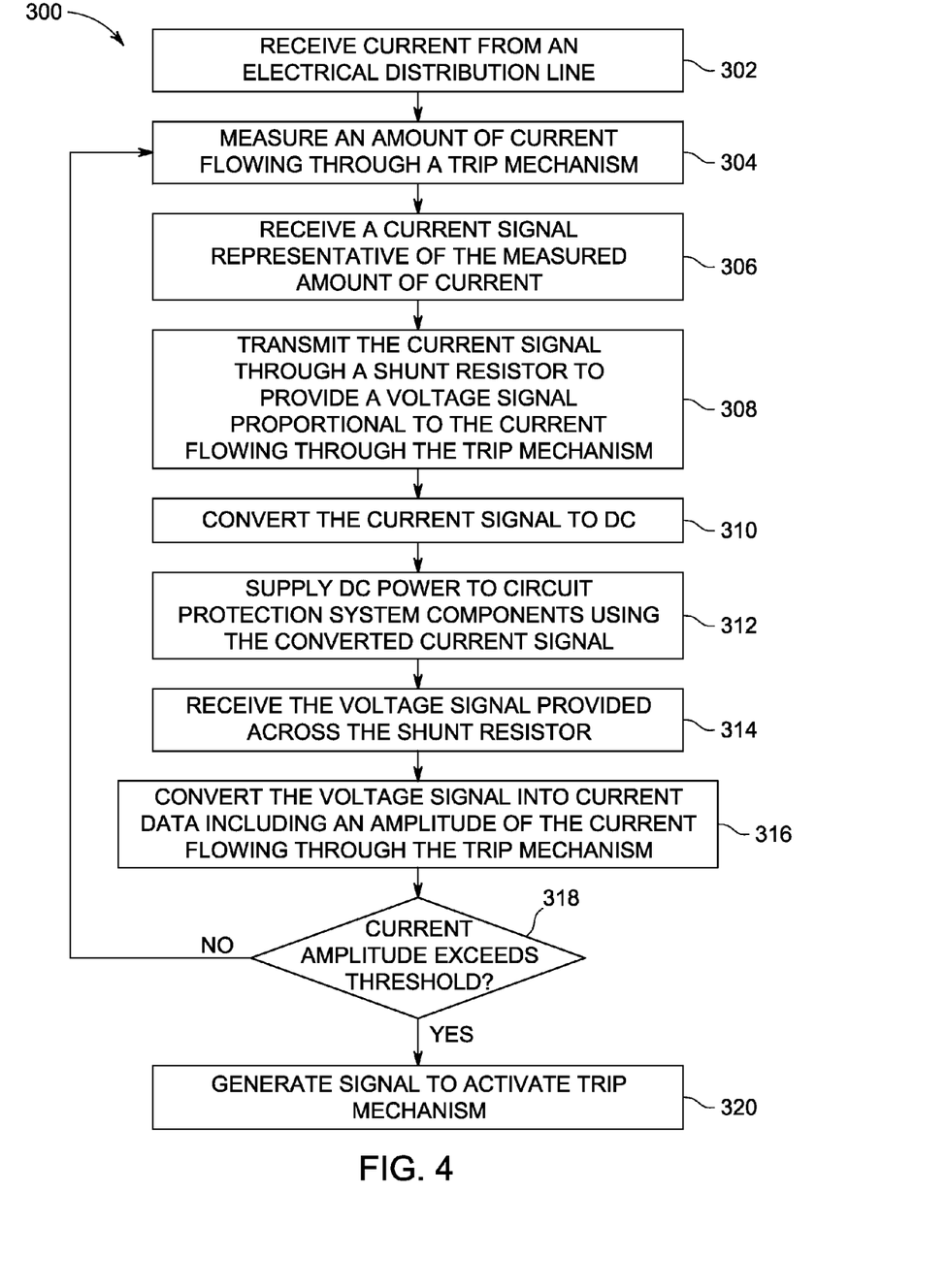
FIG. 4 is a flow diagram of an exemplary method of monitoring current provided to a load that may be used with the circuit protection system shown in FIG. 3.

FIG. 4 is a flowchart of an exemplary method 300 for monitoring current provided to a load, such as load 124 (shown in FIG. 1), that may be used with circuit protection system 200 (shown in FIG. 3). Method 300 is at least partially executed by a processor, such as processor 128. For example, a plurality of computer-executable instructions are embodied within a computer-readable medium, such as memory 136 (shown in FIG. 2). The instructions, when executed by the processor, cause the processor to execute the steps of method 300 and/or to function as described herein.

In an exemplary embodiment, AC current is received 302 by circuit protection system 200 through an electrical distribution line, such as electrical distribution line 126 (shown in FIG. 2). The current flows through trip mechanism 132 to load 124. Sensor 130 measures 304 an amount of current flowing through trip mechanism 132 and generates a current signal representative of the measured amount of current flowing through trip mechanism 132.

Circuit protection device 122 receives 306 the current signal and the current signal is transmitted 308 through shunt resistor 204 to provide or generate a voltage signal across resistor 204 that is proportional to the current flowing through trip mechanism 132. Power supply 206 receives the current signal transmitted through shunt resistor 204 and converts 310 the current signal to DC. Power supply 206 supplies 312 DC power to components of circuit protection system 200 using the converted current signal.

Control circuit 208 receives 314 the voltage signal provided or generated across shunt resistor 204 and adjusts the voltage signal for use with processor 128. More specifically, gain circuit 216 adjusts an amplitude of the voltage signal to an amplitude suitable for use with conditioning circuit 218 and/or processor 128. Conditioning circuit 218 converts 316 the voltage signal into digital current data representative of the amount of current flowing through trip mechanism 132. The current data includes an amplitude and a phase angle of the current flowing through trip mechanism 132. Conditioning circuit 218 transmits the current data to processor 128.

In an exemplary embodiment, processor 128 determines 318 whether the current amplitude exceeds a current threshold. More specifically, processor 128 analyzes the current data, including the amplitude of the current, to determine whether the current threshold is exceeded. Alternatively, processor 128 analyzes the amplitude and/or phase angle of the current to determine whether a fault and/or an undesired operating condition exists within circuit protection system 200 and/or power distribution system 104. In an exemplary embodiment, if the amplitude of the current flowing through trip mechanism 132 does not exceed the current threshold, method 300 returns to measuring 304 the amount of current flowing through trip mechanism 132.

If processor 128 determines 318 that the current amplitude exceeds the current threshold, processor 128 generates 320 a control signal and transmits the control signal to flux shifter 202 to activate trip mechanism 132. Flux shifter 202 receives the control signal and generates a magnetic field in response to the control signal. The magnetic field causes flux shifter 202 to activate trip mechanism 132 to prevent current from flowing through trip mechanism 132, thus electrically disconnecting load 124 from electrical distribution line 126.

A technical effect of the method, device, and system described herein may include one or more of (a) receiving a current signal representative of an amount of current flowing through a trip mechanism to a load; (b) transmitting a current signal through at least one resistor to provide a voltage signal proportional to the current signal; (c) determining an amplitude of a current flowing through a trip mechanism to a load based on a voltage; (d) determining whether a predetermined current threshold is exceeded; and (e) generating a control signal to activate a trip mechanism to prevent current from being provided to a load.

Exemplary embodiments of a method, device, and system for monitoring current provided to a load are described above in detail. The method, device, and system are not limited to the specific embodiments described herein but, rather, operations of the method and/or components of the system and/or device may be utilized independently and separately from other operations and/or components described herein. Further, the described operations and/or components may also be defined in, or used in combination with, other systems, methods, and/or devices, and are not limited to practice with only the system, method, and device as described herein.

Although the present invention is described in connection with an exemplary power distribution system, embodiments of the invention are operational with numerous other power systems, or other systems or devices. The circuit protection system described herein is not intended to suggest any limitation as to the scope of use or functionality of any aspect of the invention. In addition, the circuit protection system described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device for use in monitoring a current flowing from an electrical distribution line through a trip mechanism to a load, said circuit protection device comprising:
    an input conductor configured to receive an alternating current (AC) current signal from a sensor;
    at least one resistor coupled to said input conductor, said at least one resistor arranged to receive the AC current signal and configured to provide an AC voltage signal proportional to the current signal;
    a control circuit coupled in parallel with said at least one resistor and configured to:
        receive the AC voltage signal;
        determine an amplitude of the current flowing through the trip mechanism based on the AC voltage signal;
        determine whether a predetermined current threshold is exceeded; and
        generate a control signal to activate the trip mechanism; and
    a power supply coupled to said at least one resistor and configured to:
        receive the AC current signal from said at least one resistor; and
        supply power to said control circuit based on the AC current signal.

2. A circuit protection device in accordance with claim 1, wherein said control circuit is configured to generate the control signal when the amplitude of the current flowing through the trip mechanism exceeds the predetermined current threshold.

3. A circuit protection device in accordance with claim 1, wherein said power supply is configured to convert the current signal to direct current (DC) and supply DC power to said control circuit using the converted current signal.

4. A circuit protection device in accordance with claim 1, wherein said control circuit comprises an analog to digital converter (ADC) configured to convert the AC voltage signal into data for use in determining the amplitude of the current flowing through the trip mechanism.

5. A circuit protection device in accordance with claim 4, wherein said control circuit comprises a gain circuit coupled to said ADC and configured to adjust an amplitude of the voltage signal for use with said ADC.

6. A circuit protection device in accordance with claim 4, wherein said control circuit comprises a processor coupled to said ADC, wherein said processor receives the data and uses the data to determine the amplitude of the current flowing through the trip mechanism.

7. A circuit protection system for use in monitoring current provided to a load from an electrical distribution line, said circuit protection system comprising:
    a trip mechanism configured to be coupled the electrical distribution line and to the load to enable a current received from the electrical distribution line to flow through said trip mechanism to the load, said trip mechanism further configured to be activated to interrupt the current flowing to the load;
    a sensor configured to measure the current flowing through said trip mechanism and to generate an alternating current (AC) current signal representative of the measured current; and
    a circuit protection device coupled to said sensor and comprising:
        an input conductor configured to receive the AC current signal from said sensor;
        at least one resistor coupled to said input conductor, said at least one resistor arranged to receive the AC current signal and configured to provide an AC voltage signal proportional to the AC current signal;
        a control circuit coupled in parallel with said at least one resistor and configured to:
            receive the AC voltage signal;
            determine an amplitude of the current flowing through said trip mechanism to the load based on the AC voltage signal;
            determine whether a predetermined current threshold is exceeded; and
            generate a control signal to activate said trip mechanism; and
        a power supply coupled to said at least one resistor and configured to:
            receive the AC current signal from said at least one resistor; and
            supply power to said control circuit based on the AC current signal.

8. A circuit protection system in accordance with claim 7, wherein said control circuit is configured to generate the control signal when the amplitude of the current flowing through said trip mechanism exceeds the predetermined current threshold.

9. A circuit protection system in accordance with claim 7, wherein said power supply is configured to convert the AC current signal to direct current (DC) and supply DC power to said control circuit using the converted AC current signal.

10. A circuit protection system in accordance with claim 9, wherein said control circuit comprises an analog to digital converter (ADC) configured to convert the voltage signal into data for use in determining the amplitude of the current flowing through said trip mechanism.

11. A circuit protection system in accordance with claim 10, wherein said control circuit comprises a gain circuit coupled to said ADC and configured to adjust an amplitude of the voltage signal for use with said ADC.

12. A circuit protection system in accordance with claim 10, wherein said control circuit comprises a processor coupled to said ADC, wherein said processor receives the data and uses the data to determine the amplitude of the current flowing through said trip mechanism.

13. A circuit protection system in accordance with claim 7, further comprising a flux shifter coupled to said control circuit, wherein said flux shifter is configured to receive the control signal and activate said trip mechanism in response to the control signal.

14. A method of monitoring current provided to a load using a circuit protection device, said method comprising:
   receiving an alternating current (AC) current signal representative of an amount of current flowing through a trip mechanism to the load from a sensor;
   transmitting the AC current signal through at least one resistor to provide an AC voltage signal proportional to the AC current signal to a control circuit that is coupled in parallel with said at least one resistor;
   determining an amplitude of the current flowing through the trip mechanism to the load based on the AC voltage signal;
   determining whether a predetermined current threshold is exceeded; and
   generating a control signal to activate the trip mechanism to prevent current from being provided to the load.

15. A method in accordance with claim 14, further comprising:
   receiving the AC current signal from the at least one resistor;
   converting the AC current signal to direct current (DC); and
   supplying DC power to at least one component of the circuit protection device using the converted AC current signal.

16. A method in accordance with claim 14, further comprising generating a magnetic field in response to the control signal, wherein the magnetic field causes the trip mechanism to be activated.

17. A method in accordance with claim 14, further comprising conditioning the AC voltage signal before said determining an amplitude of the current flowing through the trip mechanism.

18. A method in accordance with claim 14, further comprising generating the control signal when the amplitude of the current flowing through the trip mechanism exceeds the predetermined current threshold.

* * * * *